June 18, 1929.  M. H. TONCRAY  1,717,420
SEAT RETAINER
Filed May 2, 1927
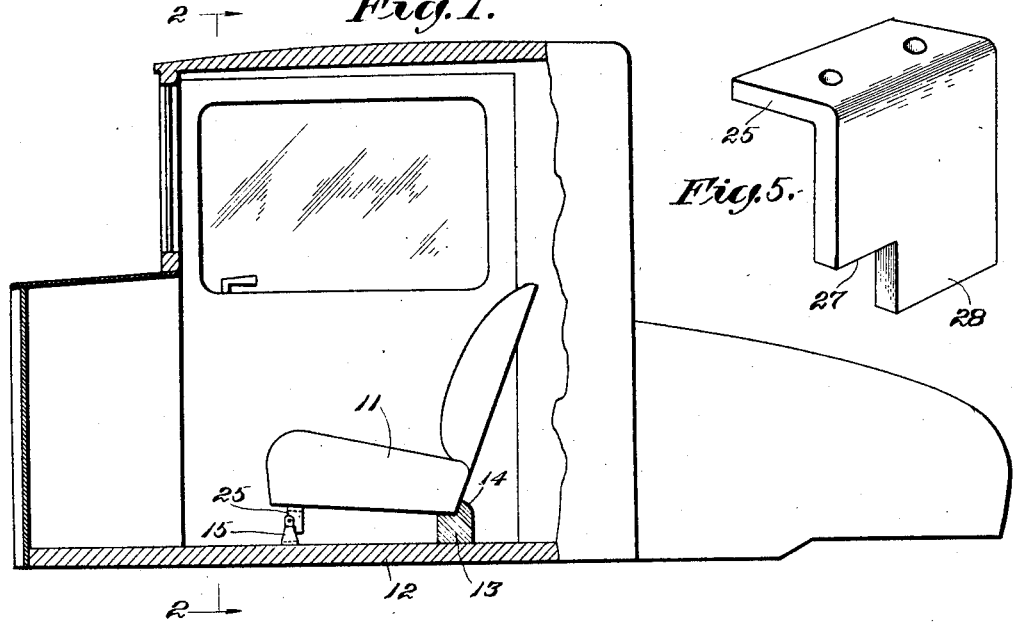
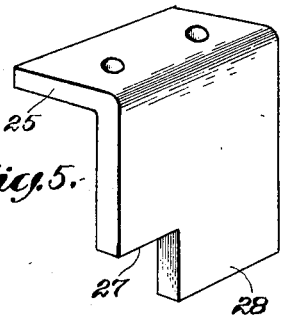
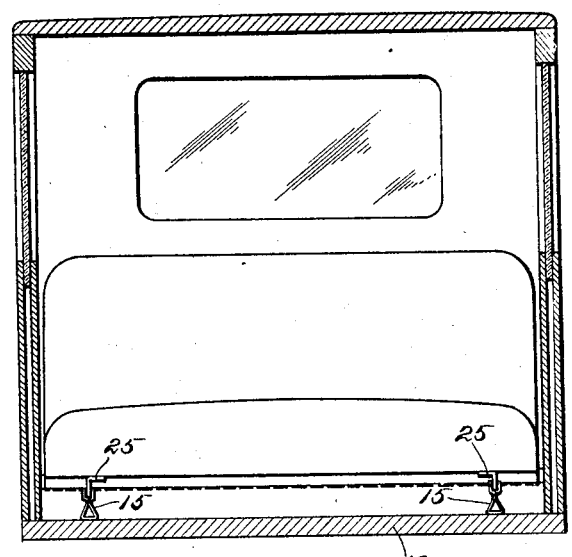
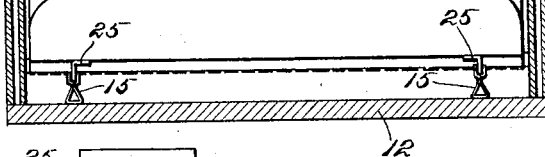
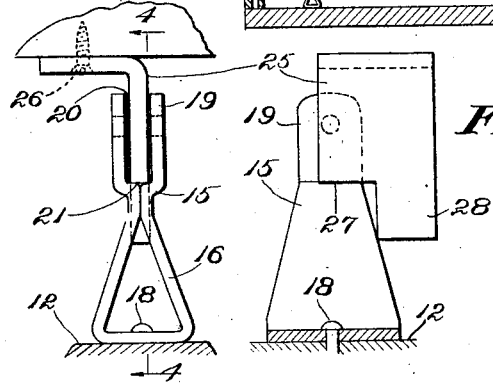

Patented June 18, 1929.

1,717,420

UNITED STATES PATENT OFFICE.

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN.

SEAT RETAINER.

Application filed May 2, 1927. Serial No. 188,123.

This invention relates to automobile bodies, and more particularly to the provision of means for retaining a bench seat in an automobile body.

It is an object of the invention to provide a bench seat retainer which will hold the seat rigidly against horizontal movements and which may be manufactured at small cost and assembled readily and conveniently.

It has been common practice to form a retainer for a bench seat in an automobile body by building an elaborate frame structure upon the floor of the automobile body arranged to support and surround the bench seat wholly or in part. Such a retainer is expensive to build and unnecessarily increases the manufacturing cost of an automobile. In accordance with the invention a bench seat is supported at either end within an automobile body by separate bearings of a type which may be employed for pivotally supporting a bucket seat. One type of bearing for this purpose has a lower portion secured to the floor of the automobile body and a slotted upper portion providing a horizontal bearing surface. It has been found that such bearings may be employed satisfactorily for retaining a bench seat and prevent horizontal movement thereof. For this purpose the bench seat may be provided with depending brackets resting in the slotted portion of the bearings and having a projection engaging a rear portion of the bearings.

The invention will be more clearly understood from the following description in conjunction with the accompanying drawings; in which, Fig. 1 is a partial sectional elevational view showing the interior of an automobile body;

Fig. 2 is a sectional view taken upon the line 2—2 of Fig. 1;

Figs. 3 and 4 are detail end and side elevational views of a support for a bench seat embodying the invention; and Fig. 5 is a detail perspective view of a bracket forming part of the seat support.

In the drawings a bench seat 11 is shown supported upon the floor 12 within the interior of an automobile body, its rear edge being held by a suitable support 13 having a projection 14 adapted to prevent backward movement of the seat 11. The front portion of the seat 11 is supported at either side thereof by bearings 15. For this purpose any suitable type of bearing may be employed, but as illustrated the bearing 15 is a type commonly employed for pivotally supporting a bucket seat. This bearing is formed from a strip of heavy sheet metal by bending to form a triangular shaped lower portion 16 which is secured to the floor of the automobile body in any suitable manner as by bolts 18. The upper portion of the bearing 15 is formed with spaced upwardly extending side walls or arms 19 providing a slot 20 having a shoulder or horizontal bearing surface 21. In accordance with the invention a bracket 25 is secured in any appropriate manner, as by bolts or screws 26 so as to depend from the bottom of the seat 11 and rest upon bearings 15 and is shaped to provide interfitting relation with the bearings to hold the seat against horizontal movement. As illustrated, the bracket 25 is provided with a substantially horizontal bearing surface 27 arranged to rest upon the surface 21 of the bearing 15. A rear projection 28, preferably extending downwardly, is provided on the bracket 25 and is arranged to engage the rear portion of the bearings 15.

In this manner a retainer of simple construction and low cost is provided which is adapted to hold a bench seat rigidly against longitudinal or side horizontal movements while permitting the seat to be raised and removed at any time. Furthermore, by providing a retainer of this type the manufacturing costs are considerably reduced by eliminating the expensive constructions heretofore in use, and by making it possible for the manufacturer to provide a large stock of supporting bearings which may be used either for supporting a bench seat or a bucket seat.

It will be understood that the embodiment of the invention described is merely by way of illustration and that the scope of the invention is not thereby narrowed nor is it intended to be limited except as defined by the appended claim.

What I claim is:

In an automobile body, in combination, a bench seat, means for supporting the rear edge of said seat and for holding the latter against horizontal movement in one direction, bearings for supporting the front edge of said seat, each of said bearings having a pair of side walls and a shoulder located between said side walls, and brackets depending from said seat between the side walls of said bearing and resting upon the shoulders thereof, said brackets having projections depending below said shoulders and engaging the same laterally to hold said seat against horizontal movement in the opposite direction.

In testimony whereof I affix my signature.

MILLARD H. TONCRAY.